United States Patent [19]

Hareng et al.

[11] 4,173,757
[45] Nov. 6, 1979

[54] LIQUID CRYSTAL DISPLAY DEVICE

[75] Inventors: Michel Hareng; Robert Hehlen; Serge Le Berre, all of Paris, France

[73] Assignee: Thomson-CSF, Paris, France

[21] Appl. No.: 835,214

[22] Filed: Sep. 21, 1977

[30] Foreign Application Priority Data

Sep. 24, 1976 [FR] France ................. 76 28768

[51] Int. Cl.² ............ G09F 9/32; G02F 1/13
[52] U.S. Cl. ................. 340/765; 340/378.2; 350/331
[58] Field of Search ............ 340/324 R, 336; 350/332, 335, 336, 331; 40/548

[56] References Cited
U.S. PATENT DOCUMENTS

| 3,718,380 | 2/1973 | Wysocki et al. ............. 350/336 |
| 4,037,927 | 7/1977 | Krueger ..................... 350/336 |
| 4,068,925 | 1/1978 | Tani et al. ................ 350/336 X |

*Primary Examiner*—David L. Trafton
*Attorney, Agent, or Firm*—Cushman, Darby & Cushman

[57] ABSTRACT

This invention provides a nematic liquid crystal display device for displaying a first information in the absence of any control voltage and substituting for that another information, or successively several other informations, by application of a control voltage. Several embodiments are described, in which either rotatory polarization effect in twisted structures or dynamic scattering effect are used.

10 Claims, 9 Drawing Figures

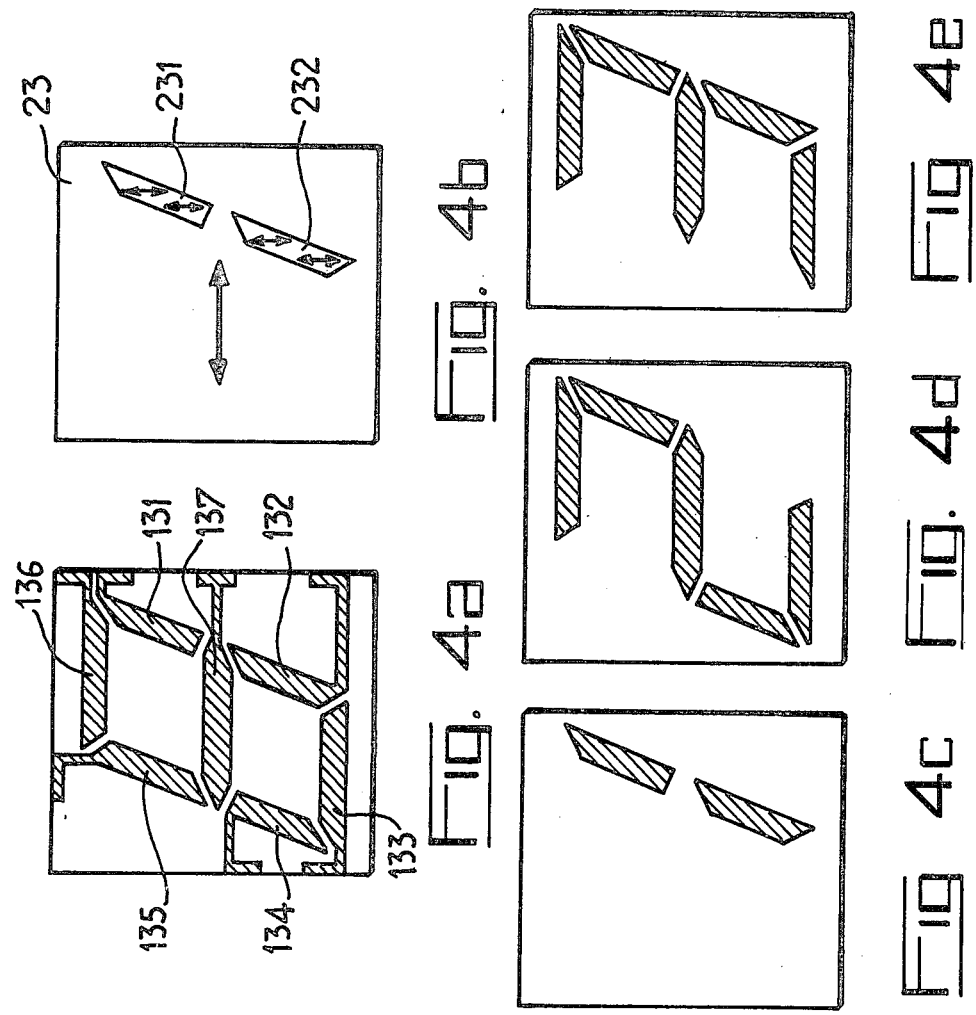

LIQUID CRYSTAL DISPLAY DEVICE

FIELD OF THE INVENTION

The present invention relates to liquid crystal display devices and more particularly to a device for displaying a first information in the absence of a control voltage and substituting for that another information or several other informations successively, when said same control voltage is applied.

BACKGROUND OF THE INVENTION

A current example of the use of this kind of device, in which the information for display occurs in the form of two items, is that of the "on-off" indication for a piece of electrical apparatus. This indication is often furnished by a light, or by a light source illuminating an inscription written on a transparent plate, this lighting up when the apparatus is connected to the mains or when an "on-off" switch is operated.

SUMMARY OF THE INVENTION

The device in accordance with the invention has various advantages in relation to these conventional devices. Firstly, it makes it possible to display a written information in the absence of a control voltage, for example when the apparatus to which it is applied is not connected to the mains, this being a feature which distinguishes it from other liquid crystal display devices. It also presents all the advantages currently offered by liquid crystal display devices: extreme compactness, minimal control power, contrast independent of the ambient light level.

The device in accordance with the invention can also be used in more sophisticated versions such as those where in addition to an information preceding the connection of an apparatus, several supplementary informations have to be supplied in a time-staggered fashion, once the apparatus is connected. A first example is that of an electrical apparatus in respect of which it is necessary to successively indicate to the user that the apparatus is disconnected, connected to the mains, live, ready for use. Another example is that of automatic vending machines where the user must be told whether the apparatus is operative or not as well as given instruction on the successive manipulations to be performed.

The proposed display device is essentially composed of a nematic liquid crystal cell utilising either the properties of dynamic scattering or those of the twisted strucure. This cell comprises at least two areas; in one of these a first information in the form of an arbitrary graphic symbol, a letter or set of letters for example, is visible in the absence of any control voltage and disappears when the control voltage is applied to the cell; in the other, or possibly others, a second and possibly a third, fourth etc., information, invisible in the absence of the control voltage, become visible in the form of other graphic symbols when the control voltage is applied; the eventual selection between these other areas is performed by applying the control voltage to electrodes arranged at the corresponding places.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIGS. 4a, 4b, 4c, 4d and 4e show a modification of the device shown in FIG. 3 using a segmental display;

In order to facilitate understanding, the various constituent elements of the devices illustrated in these various figures have been shown in exploded form and on a scale considerably expanded in the direction of their thickness. However, it should not be overlooked that in reality these elements are closely joined and are a great deal thinner than shown.

DESCRIPTION OF A FIRST EMBODIMENT

Figure 1:
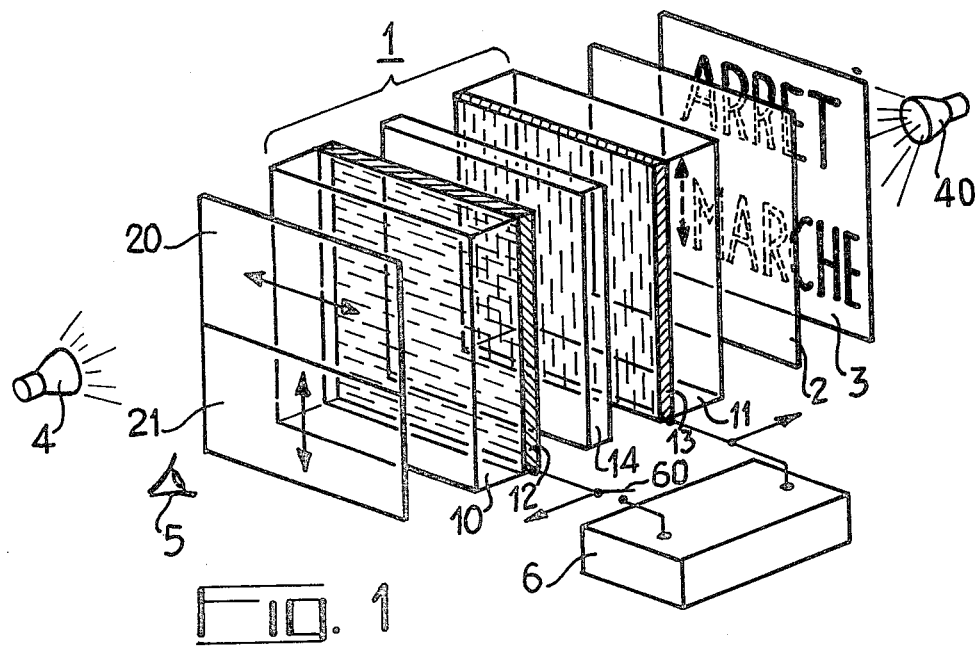
FIGS. 1 and 2 respectively show a first and a second version of a preferred embodiment of the invention using a twisted nematic layer, these versions respectively being designed for the display of two informations or for a number of informations greater than two.

FIG. 1 illustrates a first version of a preferred embodiment of the display device in accordance with the invention, this version pertaining to the case in which the information to be displayed is in the form of two items, in the present instance the informations "on-off" indicating that an apparatus integral with the display device is or not live.

A liquid crystal cell 1 is formed by two glass plates 10 and 11, on whose internal faces two uniform transparent electrodes 12 and 13 have been deposited and enclosing a thin film 14 of a material in the nematic phase, some ten microns in thickness. Means for linearly polarising light, these being constituted at the rear face by a single-plate 2 of a flat polariser and, at the front face, by two polariser half-plates 20 and 21 of identical area are arranged to either side of the cell 1, these two half-plates 20 and 21 have polarisation directions respectively perpendicular and parallel to that of the plate 2. A black absorptive surface 3 is joined to the rear part of the polariser 2; the inscriptions ARRET (off), MARCHE (on) are traced on surface 3 in the form of areas which are both reflective and diffusive and respectively located opposite the half-plates 20 and 21; the surface 3 with its inscriptions, constitutes the optical means used to reproduce the graphic symbols which transcribe the two informations for display.

A light source 4, which may be ambient light, illuminates the device via its front face constituted by the half-plates 20 and 21. The eye 5 of an observer views the device at said same front face.

A voltage generator 6 and a contactbreaker 60 allow a control voltage, either DC or AC, to be applied to the electrodes 12 and 13.

The electrodes 12 and 13 can in accordance with a known technique be constituted by a deposit of tin oxide or indium oxyde or again by a mixture of these two oxides. The nematic phase material is chosen from amongst those compounds whose molecules exhibit positive dielectric anisotropy and orientate themselves parallel to the substrate surrounding them. In accordance with a likewise known technique, the electrodes are treated, prior to the introduction of the liquid crystal, in order to impose upon the molecules in contact with them, a uniform direction of orientation parallel to the plane of the substrate (this being done for example by lightly rubbing the surface of the electrode in a given direction); in addition, arrangements are made so that the direction of orientation respectively imposed by the electrodes 12 and 13 are mutually perpendicular. Under these conditions, the material of which the thin film 14 of nematic phase material is made, acquires a twisted structure characterised by the face that the material elongated molecules are arranged in planes parallel to the electrodes, along directions of orientation which vary progressively from the direction imposed by one of the electrodes to the perpendicular direction imposed by the other.

The operation of the device shown in FIG. 1 is determined by two well-known properties of twisted nematic layers.

The first property of such a layer its optical rotating power; it causes the direction of polarisation of light passing through it to rotate through 90°. Thus, in the absence of any control voltage (contactbreaker covered) that part of the device corresponding to the area of the half-plate 20, in which the cell is arranged between the two crossed polarisers 2 and 20, is transparent; the light illuminating this portion of the cell is reflected and scattered by the OFF inscription carried by the surface 3, while absorbed by the dark background forming the remainder of this surface. The OFF inscription therefore appears to the eye 5 of the observer as a bright display against a black background. In contrast, the other part of the device, corresponding to the surface of the half-plate 21 where the cell is arranged between the parallel-orientated polarisers 2 and 21, is opaque and appears uniformly black, thus making the inscription ON.

The second property of a layer having a twisted nematic structure, is that it loses its rotating power when subjected to a control voltage of adequate level (3 to 6 volts depending upon the nature of the liquid crystal material used). The long molecules, exhibiting positive dielectric anisotropy, orientated themselves parallel to the electric field thus developed, and therefore perpendicularly to the electrodes; the layer thus acquires a homeotropic structure which does not affect the polarised light. Consequently, when, on closing he contactbreaker 60, the control voltage supplied by the generator 6 is applied across the electrodes 12 and 13, the optical properties of the device are reversed; the part corresponding to the half-plate 20 becomes opaque and the OFF inscription disappears whilst the part corresponding to the half-plate 21 becomes transparent and the ON inscription appears as a bright display against a black background.

The two inscriptions could equally be traced in black upon a diffusive reflective background. The information is then displayed in black against a bright background.

The device described by FIG. 1 can also, at the expense of a few slight modifications, be operated in transmission. Depending upon whether the information is to be displayed as black against a bright background or bright against a black background, the surface 3 is converted to a surface which is either transparent outside the inscription and absorptive at the location of the inscriptions, or vice-versa, and the light source is located at 40. Even more simply, opaque letters may be stuck to the back face of the polariser 2.

Figure 2:
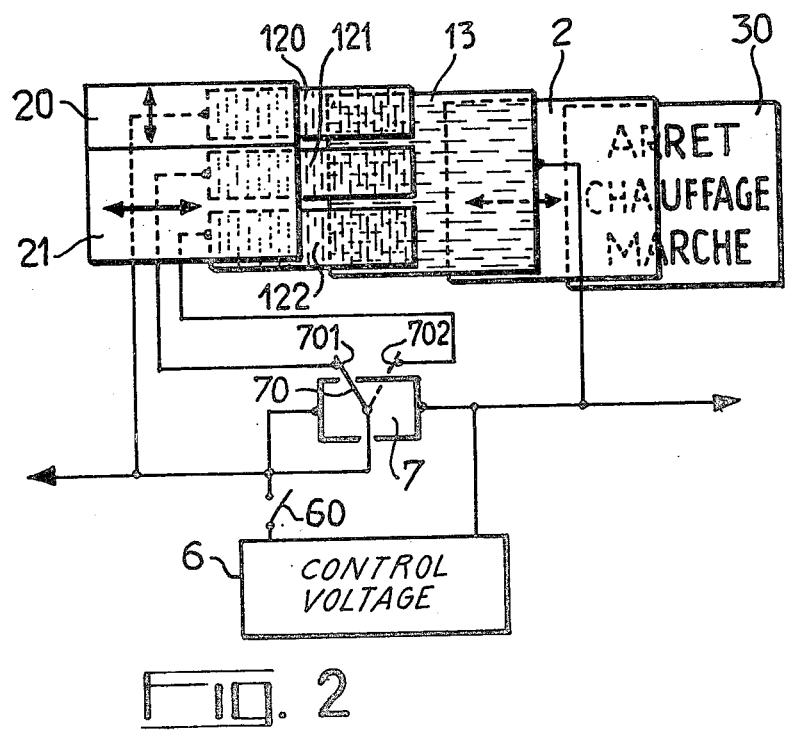

FIG. 2 relates to a second version of the preferred embodiment of the invention shown in FIG. 1, this version being designed to accommodate the case in which several successive informations are to be displayed on the application of the control voltage. THe illustrated device displays three separate informations, in this instance the informations "ARRET" (off), "CHAUFFAGE" (heater) and "MARCHE" (on) relating to an apparatus which is such that it can only be used a certain time after the voltage has been applied to it.

In this FIG. 2, the illustration has been confined to the polarisers 20 and 210 arranged in the same plane as those 20 and 21 of FIG. 1, the electrodes 120, 121 and 122 replacing that 12, the electrode 13, the polariser 2 orientated parallel to that 21, and the surface 30 carrying the items for display, this surface occupying the same position as the surface 3 in FIG. 1. Although not shown in FIG. 2, the device also comprises two glass plates which respectively carry the electrodes 120, 121, 122 on the one hand and that 13 on the other, and a thin film 14 of a nematic phase material arranged between the two sets of electrodes; these elements are identical to those shown in FIG. 1. As in the former device, the electrodes 120, 121, 122 on the one hand and that 123 on the other are treated in order to impart mutually perpendicular fixing directions to the liquid crystal molecules and thus to give the nematic layer a twisted structure.

A contactbreaker 60 applies the direct or alternating voltage supplied by a voltage generator 6 to the apparatus (not shown) in respect of which the device shown in FIG. 2 acts an an indicator, and also to a timed relay 7 controlling a switch 70. The electrode 13 is connected to one of the terminals of the generator 6 and the electrodes 120, 121 and 122 to the other terminal via the contactbreaker 60 (directly in the case of the first of these electrodes and via the two terminals of the switch 70 in the case of the two others).

In the absence of any voltage applied to the apparatus (contactbreaker 60 open), no voltage is applied across the two sets of electrodes. The nematic layer then has a twisted structure over the whole of its area and produces 90° rotation in the linearly polarised light so that only the "ARRET" (off) indication located between two crossed polarisers, appears.

When the voltage is applied to the apparatus (contact-breaker 60 closed), the timed relay 7 places the switch 70 in the position 701. The voltage is then applied between the electrode 13 and the electrodes 120 and 121; that part of the layer covered by the electrode 122, which is the only part to retain its twisted structure, remains opaque, by contrast, the proportion covered by the electrode 121 becomes transparent and that covered by the electrode 12 opaque. In this instance, therefore, only the "CHAUFFAGE" (heater) indication appears.

When the delay time has elapsed, the relay 7 places the switch 70 in the position 702, applying voltage between the electrodes 13 on the one hand and 120 and 122 the other. Only that part of the thin film covered by the electrode 121 retains its twisted structure and the sole indication "MARCHE" (on) is displayed.

DESCRIPTION OF A SECOND EMBODIMENT

Figure 3:
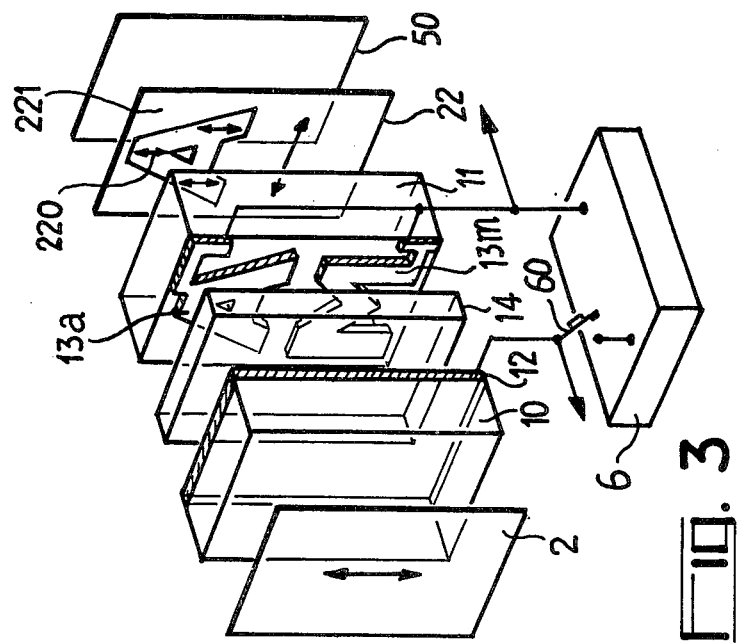
FIG. 3 shows a second embodiment of the device in accordance with the invention likewise using a twisted nematic layer.

FIG. 3 illustrates a second embodiment of the device in accordance with the invention. In this new embodiment, like in that of FIG. 1, a twisted nematic cell is used to display a binary information.

A nematic phase liquid crystal layer 14 exhibiting positive dielectric anisotropy and orientated parallel to the walls is located between two glass plates 10 and 11. The plate 10 is coated over the whole of its internal surface with a uniform transparent electrode 12.

Two transparent electrodes 13a and 13m, respectively taking the form of an A to symbolise the word "ARRET" (off) and an M to symbolise the word "MARCHE" (on) are deposited on plate 11 internal surface; the surfaces in contact with the nematic layer are treated to impose a twisted structure. The liquid crystal cell formed by the elements 14, 10, 11, 12 13a and 13m is enclosed between flat linear polarisers 2 and 22. The first polariser 2, with uniform polarisation direction is applied against the plate 10. The second polariser 22, applied against the plate 11, is divided in two parts 220 and 221 separated by a contour of A shape which reproduces exactly both in shape and size, the contour of the electrode 131; the polarisation directions of the parts 220 and 221 are perpendicular to one another and the polarisation direction of the part 220 is parallel to that of the polariser 2. A mirror 50 can be arranged behind the assembly of the device in order to enable the latter to be observed by reflection.

A contactbreaker 60 applies the control voltage supplied by a generator 6 between the electrode 12 and 13a and 13m.

In the absence of any control voltage, the nematic layer 14 is uniformly twisted and causes the linearly polarised light passing through it to rotate through 90°. The interior 220 of the contour A corresponding to parallel-orientated polarisers, is the only part to block the light so that it stands out as black against a bright background.

When the control voltage is applied between the electrode 12 and those 13a and 13m, those parts of the film 14 located between these electrodes lose their twisted structure and therefore their rotating power. The symbol A which is illuminated between parallel-orientated polarisers, becomes transparent and no longer distinguishable from the background; by contrast, the symbol M, illuminated between cross polarisers becomes absorbent and appears as black against a bright background.

To arrange that the displayed information appears as bright against a background, it is merely necessary in the device of FIG. 3 to reverse the directions of polarisation of two parts 220 and 221 of the polariser 22.

It is also possible, in the device shown in FIG. 3, to modify the electrodes 13a and 13m so that the letters A and M are substituted by non conductive parts. Retaining the polarisation directions of the two parts 220 and 221 of the polariser 22, as indicated in FIG. 3, the symbol A appears as dark against a bright background in the absence of any control voltage. On application of the latter, the letter A disappears and the letter M appears as bright against a dark background.

The device shown in FIG. 3 can readily be adapted to the display of several successive informaions once the control voltage has been applied, by a modification similar to that which enabled the device of FIG. 1 to be converted to that of FIG. 2. The plate 11 is then equipped with as many electrodes 13a, 13m, etc., as there are successive pieces of information to display; only the information which is to be displayed in the absence of any control voltage is reproduced upon the polarising plate 22 in the form of a modification of its polarisation direction. The control voltage is applied simultaneously to the electrode corresponding to the information for display in the absence of any control voltage, in order to erase this piece of information, and to the electrode corresponding to the information for display in order to cause the latter to appear.

FIGS. 4a to 4e provide a plain illustration of the modifications which have to be made to a device of the kind shown in FIG. 3 in order to enable it to successively display different informations, one of these in the absence of the control voltage, by the technique known as segmental display; this method consists in combining successively several given segments of assembly in order to form different characters. The successive informations then appear in the same area of the display system and not in adjacent areas as in the devices of FIGS. 1, 2 and 3.

The example described concerns a case where, by a seven-segment display, it is desired to successively display the digits: "1" in the absence of any control voltage and "2" and "3" on application of said voltage.

FIG. 4a illustrates a known seven-electrode device in the form of segments 131 to 137 which, arranged upon the internal face of the plate 11 shown in FIG. 3, replace the electrodes 13a and 13m of said same figure.

FIG. 4b illustrates the polarising plate 23 which replaces the polarising plate 22 of FIG. 3. The direction of polarisation of this plate is crossed in relation to that of plate 21, with the exception of the segments 231 and 232 which have a parallel polarisation direction; these segments 231 and 232 are highly accurately superimposed at the time of assembly of the device, on the reflective electrodes 131 and 132.

In the absence of the control voltage, the segments corresponding to the electrodes 131 and 132, viewed between parallel polarisers, appear as black against a bright background because of the twisted nematic structure. As FIG. 4c shows, the digit 1 is then displayed to the observer.

The control voltage, in a first stage, is applied between the electrode 12 and those 132, 133, 134, 137. The segment 131 remains absorbent and therefore black. The segment 132 becomes transparent and therefore bright and ceases to be distinguishable from the background. The segments 133, 134, 137 in which the twisted structure has disappeared and which are located between crossed polarisers, are absorbent and therefore appear black. As FIG. 4d shows, the digit 2 is then displayed.

When, in a second stage, the control voltage is applied between the electrode 12 and the electrodes 133, 136 and 137, the segments 131 and 132 remain black whereas those 133, 136 and 137 become black. The display then yields the digit 3 in the manner shown in FIG. 4e.

In order to create this device, it is possible to use a display cell of commercially available kind with seven segments, in which, depending upon the digits to be displayed certain segments are left unused. It is also possible to arrange that on the cell plate only those segments are engraved which are required for the display of the particular characters.

The invention is applicable to all multisegment electrode systems. For a black display against a bright background, the display is examined between crossed polarisers by substituting in one of the polarising plates, a parallel orientated region opposite the sole segments which are to be displayed in the absence of any voltage. The application of the control voltage erases the segments arranged between parallel polarisers and causes those between crossed polarisers to appear. A reverse orientation of the polarisers is adopted to obtain a bright display on a black background.

DESCRIPTION OF A THIRD EMBODIMENT

Figure 5:
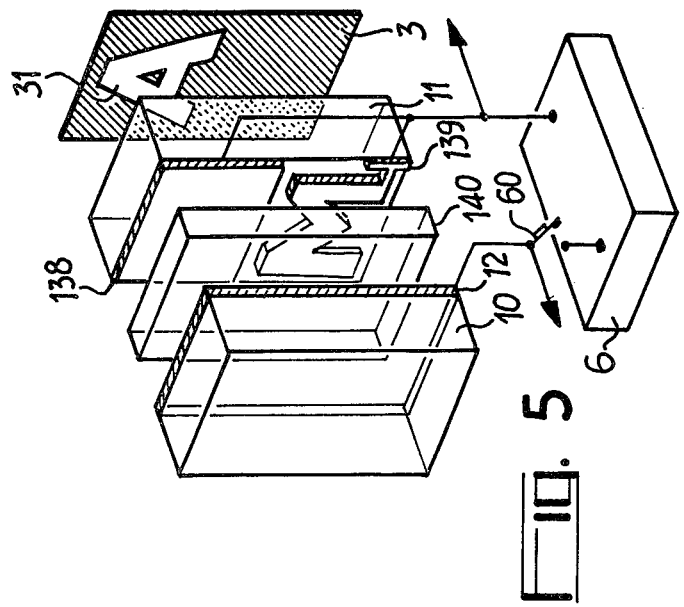
FIG. 5 shows a third embodiment of the device in accordance with the invention using a nematic film with dynamic scattering effect.

FIG. 5 illustrates a final embodiment of the device in accordance with the invention, using once again a cell which contains a thin film of a nematic phase material, in which application of the control voltage causes the phenomenon known as dynamic scattering to occur. This phenomenon occurs in a thin nematic film whose molecules are uniformaly oriented in relation to the walls and which is therefore transparent, on the appearance, under the effect of an electric field, of a disordered structure which has a strong scattering effect on light. The field values which produce dynamic scattering are slightly higher than those which produce transformation from a twisted structure to a homeotropic structure.

The device of FIG. 5 comprises a liquid crystal cell, two parallel glass plates 10 and 11 surrounding a thin nematic layer 140 of 10 to 50 microns in thickness. Upon the internal faces of the plates 10 and 11 there are deposited transparent electrodes; the electrode 12, deposited upon the plate 10, is uniform and covers the whole of the plate. The top half of the plate 1 is covered by a uniform electrode 138 which is transparent; the bottom half of this same plate has a second, likewise transparent electrode 139 deposited upon it, whose shape reproduces the information which is to be displayed when the voltage is applied to the device, in the present instance the letter M. A black and absorbent surface 3 is attached to the back face of the plate 11; on this surface 3 there is inscribed in the form of areas 31 which are both reflective and diffusive, and which are located in the top half covered by the electrode, the information which is to be displayed in the absence of any control voltage, in the present case the letter A. A contactbreaker 60 applies between the electrode 12 on the one hand and those 138 and 139 on the other, the control voltage furnished by a generator 6.

The surface in contact with the thin liquid crystal film can, in accordance with the prior art, be treated to promote the uniform orientation of the material, an effect which can equally well be obtained by adding traces of an appropriate surfactant to the liquid crystal material.

A light source, not shown in the figure, or again ambient light, illuminates the device which is viewed from the side at which illumination is directed.

In the absence of any control voltage, the thin film is uniformly transparent. The reflective and diffusive parts 31 reflect the light to the eye of the observer and the letter A stands out as bright against a black background. When the control voltage is applied, the top half of the film becomes uniformly scattering and masks the letter A; by contrast the bottom part does not become scattering except in the areas covered by the electrode 139 and the letter M therefore stands out as bright against the black background.

The device of FIG. 5 can be modified in the following way in order to cause the information to appear as black on a bright background. The electrode 138 and 139 are replaced by a transparent electrode which uniformly covers the nematic film except at certain parts which define the inscription M; for its part, the letter A is inscribed in absorbent black on a reflective and diffusive background.

If several informations are to be displayed successively, the electrode 139 of FIG. 5 is replaced by as many separate electrodes as there are informations to display under the effect of the control voltage, the latter then being applied permanently to the uniform electrode 138 and successively to each of the other electrodes as in the device shown in FIG. 2.

What we claim is:

1. A device for alternately displaying one first and at least one second information respectively in the absence and in the presence of a control voltage; said device comprising:

a liquid crystal cell including a layer of a nematic material, one first uniform electrode and at least one second electrode; said first and said second electrode being respectively arranged on one side and the other of said layer for receiving said control voltage and said second electrode facing at least part of said first electrode;

permanent transcription means arranged on at least part of a first outer face of said cell for transcribing at least said first information by a permanent variation in the optical properties of said means; said second electrode covering at least the transcription of said first information in said permanent transcription means;

and commutation means for applying said control voltage between said first and at least one said second electrode;

said first information and said second information being respectively visible and invisible when said control voltage is not applied between said electrodes and the application of said control voltage between said electrodes modifying an optical property of said film for occulting said first information and causing said second information to appear.

2. A device as claimed in claim 1, wherein said layer has a twisted structure and a homeotropic structure respectively out of and on application of said control voltage between said electrodes.

3. A device as claimed in claim 2, further comprising first and second linear optical polarisation means respectively arranged on one face and the other of said cell, one of them being inserted between said cell and said permanent transcription means; said first polarisation means having a uniform polarisation direction and covering the whole of said permanent transcription means.

4. A device as claimed in claim 3, wherein said permanent transcription means include a first and at least a second area for transcribing respectively said first and at least said second information in the form of variations of one of the coefficients of transmission and reflexion; said first electrode uniformly covering said layer; said second polarisation means having a first and a second region for respectively covering said first and second areas; and the polarisation directions of said first and second regions being respectively perpendicular and parallel to the polarisation direction of said first polarisation means.

5. A device as claimed in claim 4, wherein said second information being single, said second electrode uniformly covers said layer.

6. A device as claimed in claim 4, wherein said permanent transcription means including a plurality of second areas for each transcribing one said second information, said cell includes as many of said second electrodes as there are said first and second areas; each said second electrode uniformly covering one said area; and said commutation means applying said control voltage between said first electrode and, simultaneously, the second electrode covering the first area and one second electrode covering a second area.

7. A device as claimed in claim 2, wherein said permanent transcription means are first flat linear polarisation means having at least one first and at least one second region with crossed polarisation directions; the shape of said first region transcribing the single and first information; said device further comprising at least one second electrode identical in shape with at least one said first region and arranged in register therewith and second flat polarisation means having a polarisation direction perpendicular to that of said first region and arranged on the second face of said cell for covering said first and second regions.

8. A device as claimed in claim 7, wherein said cell includes as many second electrodes as there said first and second informations; said first and second regions being single; the first of said second electrodes being identical in shape with said first region and arranged in register therewith; the shape of the other said second electrode transcribing said second information; and said commutation means applying said control volage between said first electrode and simultaneously, said first of second electrodes and another said second electrode.

9. A device as claimed in claim 7, wherein said first region and said second electrodes having the shape of segments, each of said first and second informations is displayed by rendering visible at least one of said segments.

10. A device as claimed in claim 1 wherein said layer has a transparent state and a dynamic scattering state respectively out of and on application of said control voltage between said electrodes; said permanent transcription means having a black absorbing region and a scattering reflective region; said two regions forming a pattern for transcribing the single said first information; said cell including as many said second electrodes as there are said first and second informations; the first of said second electrodes uniformly covering said permanent transcription means; the shape of said second electrode transcribing said second information; and said commutation means applying said control voltage between said first electrode and, simultaneously, said first of second electrodes and another said second electrode.

* * * * *